United States Patent
Salvaggio, Jr.

(10) Patent No.: US 9,950,761 B2
(45) Date of Patent: Apr. 24, 2018

(54) CARBON FIBER VEHICLE COMPONENT

(71) Applicant: David Salvaggio, Jr., Grafton, WI (US)

(72) Inventor: David Salvaggio, Jr., Grafton, WI (US)

(\*) Notice: Subject to any disclaimer, the term of this patent is extended or adjusted under 35 U.S.C. 154(b) by 275 days.

(21) Appl. No.: 14/841,041

(22) Filed: Aug. 31, 2015

(65) Prior Publication Data

US 2015/0367903 A1 Dec. 24, 2015

Related U.S. Application Data

(63) Continuation of application No. 13/851,701, filed on Mar. 27, 2013, now Pat. No. 9,120,517.

(60) Provisional application No. 61/616,992, filed on Mar. 28, 2012.

(51) Int. Cl.
*B62J 23/00* (2006.01)
*B62J 35/00* (2006.01)
*B62J 6/00* (2006.01)
*F21V 23/00* (2015.01)
(Continued)

(52) U.S. Cl.
CPC .......... *B62J 23/00* (2013.01); *B62J 6/00* (2013.01); *B62J 35/00* (2013.01); *F21K 9/64* (2016.08); *F21V 23/002* (2013.01); *F21Y 2115/10* (2016.08); *Y10T 29/49826* (2015.01)

(58) Field of Classification Search
CPC ............. B62J 6/00; B62J 65/00; B62J 23/00
USPC ....... 296/1.08, 1.07, 136.01; 280/770, 304.3, 280/835; 150/167; 362/496
See application file for complete search history.

(56) References Cited

U.S. PATENT DOCUMENTS

| 4,068,859 A | 1/1978 | Dittman |
| 5,511,822 A | 4/1996 | Wolanski |
| D385,232 S | 10/1997 | Thurm |

(Continued)

FOREIGN PATENT DOCUMENTS

| DE | 20021745 U1 | 3/2001 |
| EP | 2 165 921 A2 | 3/2010 |

(Continued)

OTHER PUBLICATIONS

Immortal Graphix, "Custom Tank Pads", (2013). Retrieved from the Internet on Jun. 26, 2013: <http://www.immortalgraphix.com/customtankpads.aspx>.

(Continued)

*Primary Examiner* — Jason S Morrow
(74) *Attorney, Agent, or Firm* — Marshall, Gerstein & Borun LLP

(57) ABSTRACT

A carbon fiber shell is used to change the appearance or look of a vehicle, such as a motorcycle, and may be formed to be permanently installed as a vehicle body or non-permanently installed over an existing vehicle component to customize the appearance of a vehicle while still being removable. The carbon fiber shell is molded to match the contours or the shape of the original vehicle component so that, when installed, the shell has the same contours and thus the same physical shape as the original vehicle component. The carbon fiber shell includes integrated lighting material and a conductor that are disposed between the vehicle component and an exterior of the shell to provide functional and/or decorative lighting effects. Moreover, the shell shields the lighting material, conductor, and the associated electrical connections from external forces, objects, or other components of the vehicle.

37 Claims, 10 Drawing Sheets

(51) Int. Cl.
*F21K 9/64* (2016.01)
*F21Y 115/10* (2016.01)

(56) References Cited

U.S. PATENT DOCUMENTS

| | | | |
|---|---|---|---|
| 5,795,420 A | 8/1998 | English | |
| 5,884,380 A | 3/1999 | Thurm | |
| 6,062,601 A | 5/2000 | Willie et al. | |
| 6,152,585 A | 11/2000 | Barry | |
| 6,327,954 B1 | 12/2001 | Medlin | |
| 6,341,792 B1 | 1/2002 | Okuma | |
| 6,663,128 B2 | 12/2003 | Dichter | |
| 6,733,038 B1 | 5/2004 | Prather | |
| RE39,417 E | 12/2006 | Barry | |
| 7,266,434 B2 | 9/2007 | Mc Cullough et al. | |
| 7,475,749 B2 | 1/2009 | Yoshida et al. | |
| 7,641,371 B2 * | 1/2010 | Effner | B60Q 1/0458 362/485 |
| 7,857,928 B1 | 12/2010 | Mackey | |
| 8,752,989 B2 * | 6/2014 | Roberts | G09F 21/04 362/496 |
| 9,120,517 B2 | 9/2015 | Salvaggio, Jr. | |
| 9,188,293 B1 * | 11/2015 | Corporon | F21S 8/024 |
| 9,329,318 B2 | 5/2016 | Russert | |
| 2002/0128933 A1 | 9/2002 | Day et al. | |
| 2005/0088850 A1 * | 4/2005 | Miller | B60Q 1/268 362/503 |
| 2005/0126546 A1 | 6/2005 | Yagisawa | |
| 2005/0132997 A1 | 6/2005 | Vargas | |
| 2006/0139939 A1 | 6/2006 | Ohira et al. | |
| 2011/0120795 A1 | 5/2011 | Roby et al. | |
| 2011/0137758 A1 | 6/2011 | Bienias | |
| 2011/0169251 A1 | 7/2011 | Arndt et al. | |
| 2012/0094106 A1 | 4/2012 | Honma et al. | |
| 2012/0280528 A1 | 11/2012 | Dellock et al. | |
| 2012/0320615 A1 | 12/2012 | Englert | |
| 2014/0003072 A1 * | 1/2014 | Yamamoto | B60Q 1/268 362/503 |
| 2014/0240999 A1 * | 8/2014 | Roberts | B60Q 1/2615 362/510 |
| 2015/0046027 A1 * | 2/2015 | Sura | B60K 35/00 701/36 |
| 2015/0174642 A1 | 6/2015 | Krammer et al. | |
| 2015/0291085 A1 * | 10/2015 | Manning | B60Q 1/2619 362/516 |
| 2015/0307033 A1 * | 10/2015 | Preisler | B60R 13/02 362/488 |
| 2016/0258591 A1 * | 9/2016 | Salter | B60Q 1/323 |

FOREIGN PATENT DOCUMENTS

| | | |
|---|---|---|
| JP | 10-181658 | 7/1998 |
| JP | 2000-177408 A | 6/2000 |
| WO | WO-2013/148848 A1 | 10/2013 |

OTHER PUBLICATIONS

Immortal Graphix, "Customize Your Own", (2013). Retrieved from the Internet on Jun. 26, 2013: <http://www.immortalgraphix.com/customizeyourown.aspx>.

Mad Mac's Custom Graphic Designs, Inc., "Mad Mac's Custom Cover Ups". Retrieved from the Internet on Jun. 26, 2013: <http://www.madmacscustom.com/COVERUP.html>.

Mag-Knight™ Inc., "Mag-Knight Products Page", (2010) Retrieved from the Internet on Jun. 26, 2013: <http://www.mag-knight.com/products.htm>.

Hell's Foundry, Inc., "Exclusive Accessories for your Harley Davidson Bagger",(2005-2013). Retrieved from the Internet on Jun. 26, 2013: <http://www.hellsfoundry.com/dashlink.htm>.

Immortal Graphix, "Designing Your Own Tank Pac," (2013). Retrieved from the Internet on Jun. 26, 2013: <http://www.immortalgraphix.com/designingyourowntankpad.aspx>.

Cobra International, Inc., "Street Glo Hotwraps," (2013). Retrieved from the Internet on Jun. 26, 2013: <http://www.streetglo.net/hotwraps.motorcycle.html>.

Vicious Cycle, "Cycle Bagger Parts," (2013). Retrieved from the Internet on Jun. 26, 2013: <http://vicious-cycles.com/baggerparts.html>.

Harley-Davidson, Inc., "H-D1 Customization," (2001-2013). Retrieved from the Internet on Jun. 26, 2013: <http://www.harley-davidson.com/en_US/Content/Pages/H-D1_Customization/bike-builder.html>.

International Search Report and Written Opinion for Application No. PCT/US2013/034124, dated Jul. 11, 2013.

EasyComposites Ltd, Beginners' Guide to Out-of-Autoclave PrepregCarbon Fibre, pp. 121. Retrieved from the Internet on Sep. 26, 2016: http://www.easycomposites.co.uk/downloads/TDS/EC-TDS-Beginners-Guide-to-Prepreg-Carbon-Fibre.pdf.

Office Action for U.S. Appl. No. 15/656,980, dated Dec. 18, 2017.

International Search Report and Written Opinion for Application No. PCT/US2017/058399, dated Feb. 22, 2018.

* cited by examiner

CARBON FIBER VEHICLE COMPONENT

CROSS REFERENCE TO OTHER APPLICATIONS

This is a continuation of U.S. patent application Ser. No. 13/851,701, filed Mar. 27, 2013, now U.S. Pat. No. 9,120,517, which claims the benefit of and priority to U.S. Provisional Patent Application Ser. No. 61/616,992 filed on Mar. 28, 2012, the entire contents of each of which are incorporated herein by reference.

DESCRIPTION OF THE RELATED ART

Motor vehicles owners, and especially motorcycle owners, often customize the appearance of components of their vehicles beyond the offerings provided by original equipment manufacturers (OEMs). Customizing the appearance of components of a vehicle, such as motorcycle tanks or fenders, automobile panels, etc., adds a degree of individuality to the vehicle that is valued by owners, especially when the vehicle model is broadly available to the public. These customizations can differentiate the vehicle in a racing competition, indicate membership in an organization, indicate an official status such as a police officer, or simply express the personality or style of the vehicle owner to others. Despite the large number and variety of customizations available in the marketplace, a few common customization characteristics are generally most valued by consumers. The value added to a customized vehicle often lies with the extent of customization, the quality of the modification, the tools and skill set required to perform the customization, and the cost to the owner. Vehicle modifications that have little consequence over what is available from the OEM typically have a corresponding low value to the owner. When a customization does not match the level of quality of the rest of the vehicle, the customization has a similarly low value to the owner. Owners who prefer to customize their vehicles as a hobby using their own tools and skill set value customizations that can be completed without specialized tools or an extensive skill set. The level of vehicle customization typically corresponds to the financial cost, so the level of customization is often a function of the budget of the owner. Therefore, high quality customizations that can be completed at low cost with a basic set of tools are most highly valued by vehicle owners.

Moreover, other important customization characteristics considered by vehicle owners when attempting to customize their vehicles is the amount of downtime that the vehicle must experience to perform the customization and whether the customization is a permanent modification or a revisable modification of the vehicle. Owners value the time they have to use their vehicles, and so customizations that require excessive downtime of the vehicle, i.e., that require the vehicle to be unusable for their intended purpose for a long period of time during the customization process, are undesirable. Moreover, modifications that permanently alter original vehicle components prevent the owner from returning the vehicle to its original condition prior to sale, and also make it less likely that the owner can make additional or different modifications to that particular vehicle component in the future. As a result, modifications that can be installed quickly and uninstalled without damaging or altering original vehicle components are highly valued.

The most obvious and well-known manner of customizing the appearance of a vehicle or of a vehicle component, such as the tank of a motorcycle, is to repaint the component. In many cases, this type of customization requires the owner to disassemble the vehicle and apply a custom paint job to the component. The custom paint job may include a new shade, color or pattern of paint and/or may include artist designs, such as depictions of animals, logos, stars, or other artistic renderings. In order to be of a high quality, custom paint jobs must typically be performed by a professional, which can be cost prohibitive for many vehicle owners. This type of customization also typically requires excessive downtime, because the vehicle needs to be disassembled, parts thereof must be sent to a professional to apply paint, and the vehicle must be reassembled. To return the vehicle to the original configuration, the owner would need to strip the paint from the repainted surfaces and have the original finish re-applied, which may or may not be possible, and again may be cost prohibitive.

Various other manners of customizing a vehicle or a component of a vehicle have been developed in an attempt to reduce some of the problems associated with customized paint jobs. In particular, in an attempt to reduce the cost of having a professional apply a customized paint design to a vehicle, techniques have been developed to print or apply preconfigured designs or decals directly onto a vehicle component. However, direct printing or decal application solutions still generally require the component to which the printing or decal is to be applied to be removed from the vehicle and sent to a printing professional, suffering similar downtime and cost disadvantages. Applying a pre-printed screen to a vehicle component also requires removal of the component from the vehicle and requires specialized skill in applying the screen or decal so that the customization is of acceptable quality. In some cases, these techniques also require preparation of the surface of the vehicle component, such as priming, sanding, undercoating, etc., that destroy or alter the original surface coating of the vehicle component. Moreover, such printing screens and decals are typically not designed to be able to be removed from the surface of the component, once applied. As a result, these techniques irreversibly alter the original paint or other surface application of the vehicle, making it difficult to return the vehicle to its original factory made condition.

Another vehicle customization technique that has been developed uses preformed or premade shell covers made of plastic or fiberglass that may be applied over an original vehicle component and attached thereto with adhesive. One such shell cover used for motorcycle tanks is described in U.S. Pat. No. 7,857,928. Generally speaking, this shell cover is designed to cover up damage or to provide a customized look to a vehicle component. However, there are still numerous problems associated with these types of shell covers. In particular, the adhesive used to adhere the shell cover to the surface of the original component may damage the original finish of the surface or make it impossible to remove the shell cover to return the vehicle to the original configuration. These types of shell covers are also made of plastic or fiberglass, which detracts from the look or function of the original vehicle component because these shell covers must be constructed to be of unacceptable thickness to be sturdy enough for mounting on the vehicle. In particular, shell covers made of plastic or fiberglass must be manufactured to be of a minimum thickness on the order of ¼ inches, which when applied over the original vehicle component, such as a motorcycle tank, make the tank look unacceptably larger than the original, thereby detracting from the original design of the vehicle. Moreover, in the case of a fiberglass tank shell such as those disclosed in U.S. Pat. No. 7,857,928, the tank shell is installed by placing the tank shell down on top of the original shell, which means that the tank shell cannot be formed to match the shape or curves of the original tank on all sides thereof, again altering the look of the original design of the vehicle in an unacceptable manner. Moreover, in this case, the bottom of the tank shell forms a straight edge that easily catches and tears the clothing of the rider.

Still further, many types of shell covers must be mounted onto the vehicle using support structures that must be welded or otherwise attached to one or more original vehicle components. These designs, however, require the vehicle owner to have access to welding equipment and the skill set to use this equipment safely and effectively. Moreover, these techniques again require modification of the original vehicle components, and prevent or reduce the ability of the owner to return the vehicle to its original configuration. The original components may also be damaged by the welding process and may not function as designed by the OEM. Modification options that cut away portions of the vehicle components to provide, for example, backlighting or other lighting effects on the vehicle suffer similar issues because the vehicle component cannot be returned to its original configuration, and the vehicle component may be damaged during modification.

There are also numerous customization techniques in the marketplace that secure surface pads to a vehicle using magnetic sheeting. In some cases, these surface pads can have pre-selected designs applied thereto. However, these surface pads are typically preformed to mount to only a portion of a vehicle component to protect only a portion of the surface of the vehicle and/or to customize only a portion of the appearance of the vehicle. In any event, these products suffer from not being securely fastened to the vehicle chassis and as having a tendency to move during operation of the vehicle, possibly preventing the safe operation of the vehicle. Further, these surface mounted pad products will not adhere to non-magnetic metal surfaces, such as aluminum, or non-metallic surfaces such as fiberglass or carbon fiber. These types of vehicle modifications also suffer from having an unprofessional or inferior look.

While there are services that print custom images onto vehicle surface pads which are then shipped to consumers, these pads typically are installed with adhesive and thus cannot be removed without damaging the finish of the vehicle component surface. Vehicle component coverings mounted with straps or fasteners can change the appearance of the component and can move or become untied during operation, leading to a potential hazard.

SUMMARY

A carbon fiber shell is used to change the appearance or look of a vehicle, such as a motorcycle, and is formed to be non-permanently installed over an existing vehicle component to customize the appearance of a vehicle while still being removable. The carbon fiber shell, which may be, for example, a shell for a motorcycle tank or other motorcycle, automotive or recreational vehicle component such as a fender, a hood, etc., is molded to match the contours or the shape of the original vehicle component so that, when installed, the shell has the same contours and thus the same physical shape as the original vehicle component. Moreover, the carbon fiber shell may be configured to be mounted onto the vehicle using existing mounting brackets, holes or other structure on the vehicle that is used to mount or secure the original vehicle component, thereby eliminating the need to drill holes into, or apply glue or other adhesives to the original vehicle component. This feature additionally allows the carbon fiber shell to be removed in the same manner as the original vehicle component.

Because the shells described herein are constructed of carbon fiber, they can be constructed with superior strength and rigidity as compared to plastic or fiberglass shells while still being significantly thinner than plastic or fiberglass shells. In order to maintain the required strength and rigidity, preferably the carbon fiber shell may be constructed to be at less than $1/8^{th}$ of an inch thick, and contain three or four layers of carbon fiber material. By constructing the carbon fiber shell as thin as possible, the original look of the vehicle component can be maintained when the shell is installed. Moreover, the shell does not interfere with the safe operation of the vehicle.

The carbon fiber shells described herein may be easily customized to display personalized designs by enabling a user to apply or to have applied customized graphics and/or lighting materials to the exterior of the carbon fiber shell. Customizing the carbon fiber shell may be performed by painting the shell, applying decals to or wrapping the shell with preformed wrapping materials having graphics printed thereon. Customizing the surface of the carbon fiber shell, as opposed to customizing the actual vehicle component, reduces vehicle downtime and the costs of providing customizations to the vehicle, as it does not require the original vehicle component to be removed from the vehicle or require that the vehicle be taken to a specialty shop during the customization process. Instead, the vehicle is fully usable during the time that the carbon fiber shell is constructed and has customized visual designs applied thereto. The only down time of the vehicle occurs during the installation of the preformed carbon fiber shell onto the vehicle, which typically takes under a couple of hours.

In one case, a user or vehicle owner can use an electronic portal, such as a web page based ordering system, to select a customized carbon fiber shell to be manufactured and can additionally use this portal to select the artistic design to be applied to the carbon fiber shell to thereby customize the carbon fiber shell. This ordering system may enable the user to select the type (e.g., make, model and year) of vehicle to which the carbon fiber shell is to be applied, may enable the user to select the component of the vehicle (e.g., a fender, a tank or some other component) on which the shell is to be placed or mounted, and may enable the user to select or specify the customized design (in the form of, for example, paint designs, decals or wrapping) to be applied to the shell. The user may select one or more of a number of pre-stored or pre-fabricated designs and/or colors to be applied to the shell, or may enable the user to provide or specify a specific user created design and/or color scheme. After the user specifies the particular vehicle component and the artistic or visual design to be applied to the shell, the shell is manufactured according to the specified design and may then be shipped or otherwise delivered to the user, at which time the user can install the customized shell onto the vehicle.

Because the carbon fiber shell typically fits over the surface of the original vehicle component using the mounting structure already on the vehicle, installation of the carbon fiber shell can be accomplished with a basic skill set and tools utilizing the existing support structures of the vehicle. In many cases, the existing vehicle component requires no modification and suffers no damage during installation of the carbon fiber shell. Removal of the carbon fiber shell returns the vehicle component to its "stock" configuration for resale or enables the installation of a different customized carbon fiber shell at a future time.

In one case, the carbon fiber shell may be customized to include lighting features, such as backlighting that shines through a decal or paint, a customized set or pattern of lights, such as light bulbs of the same or various different colors in a particular pattern, etc. If desired, the lighting effects may be obtained using any lighting material or structure, such as light emitting diodes (LEDs), incandescent lights, etc. or using electroluminescent materials including for example, electroluminescent tape, placed on the exterior of the carbon fiber shell. The lights or electroluminescent materials may be embedded within the outer layer or below the exterior surface of the fiber shell so that the outer layer of the lights or tape is flush with that surface of the carbon fiber shell. Additionally, wires or other electrical energization mechanisms may be installed in the carbon fiber shell to energize the lights or the electroluminescent material to cause the lighting effects. If desired, the energization mechanism may energize the lights or lighting material directly from the vehicle battery or an external battery, and may do so in a continuous manner (e.g., whenever the vehicle is running or has its auxiliary electrical features energized). In other cases, the energization mechanism may energize the lights or lighting material in coordination with other electrical or non-electrical features of the vehicle, such as in coordination with the energization of the turn signals, the running lights or the headlights of the vehicle, in coordination with the speed or speedometer reading of the vehicle, in coordination with the position of the accelerator or brake of the vehicle, in coordination with the gear in which the vehicle is running, etc. In still a further embodiment, the energization mechanism may energize the lights or lighting material in a non-continuous manner using an energization pattern specified or selectable by the user to thereby vary the timing and or pattern of energization of the lighted material. Because the lighting effects are mounted onto the carbon fiber shell that is, in turn, mounted onto a vehicle component, this system enables a user to provide a significant number of unique lighting effects to a vehicle without altering the body components of the original vehicle.

According to one embodiment, a shell for a fuel tank is provided. The shell includes a first half at least partially defined by a first top edge, a first front edge recessed from the first top edge and having a first mounting flange protruding therefrom, and a first bottom edge; and a second half at least partially defined by a second top edge, a second front edge recessed from the second top edge and having a second mounting flange protruding therefrom, and a second bottom edge. According to this embodiment, when the first half and the second half cover respective side portions of the fuel tank, the first top edge at least partially aligns with the second top edge, and each of the first mounting flange and the second mounting flange aligns with a mount of the motorcycle. The shell can also include a layer of protective material disposed along a respective inside surface of each of the first half and the second half, as well as respective cutaways and/or respective ridge fittings in the first and second halves.

According to another embodiment, an apparatus for mounting to a vehicle component of a vehicle is provided. The apparatus includes a first half defining a first cavity, the first half adapted to cover a first portion of the vehicle component; a second half defining a second cavity, the second half adapted to cover a second portion of the vehicle component; and a first attachment part disposed on the first half and a second attachment part disposed on the second half. Further, according to the embodiment, when the first half and the second half cover the respective first and second portions of the vehicle component, the first half at least partially aligns with the second half, and each of the first attachment part and the second attachment part aligns with a mount of the vehicle. The apparatus can further include a layer of protective material, cutaways formed within the first half and the second half, and a ridge fitting disposed on each of the first half and the second half.

According to another embodiment, a method of manufacturing a shell for a vehicle component is provided. The method includes forming a first half with a first cavity and a second half with a second cavity, each of the first cavity and the second cavity defined by a respective at least one closed side, a respective open side, and a respective inside surface. Further, the method includes forming a first attachment mechanism on the first half and a second attachment mechanism on the second half, the first attachment mechanism and the second attachment mechanism adapted to respectively secure the first half and the second half to a vehicle. Moreover, the method includes lining the respective inside surfaces of the first half and the second half with a layer of protective material. In this embodiment, the method further includes covering respective side portions of the vehicle component with the first half and the second half and forming respective ridge fittings on each of the respective at least one closed side.

According to another embodiment, a method of manufacturing a shell having carbon fiber material for a vehicle component is provided. The method includes forming a mold of an exterior of the vehicle component, forming a first layer of carbon fiber material according to the mold, and depositing an additional layer of carbon fiber material onto the first layer. Further, the method includes repeating the depositing the additional layer of carbon fiber material to form the shell until the shell reaches a desired thickness, and applying a graphic to the shell. In this embodiment, a rendering of the shell with the graphic applied thereto can be provided.

According to another embodiment, an apparatus incorporating lighting effects for use with a vehicle is provided. The apparatus includes a shell defining a cavity for covering a component of the vehicle, a lighting material for generating light, the lighting material disposed on or within at least part of the shell, and a conductor connected to the lighting material and adapted to conduct electrical power to illuminate the lighting material. The apparatus can further include a controller for controlling illumination of the lighting material.

According to another embodiment, a vehicle body component for mounting to a vehicle is provided. The vehicle body component includes a shell element, a lighting material element integrated in or disposed on the shell element, and a conductor connected to the lighting material element and adapted to conduct electrical power to illuminate the lighting material. The vehicle body component can further include a controller for controlling illumination of the lighting material.

According to another embodiment, a method of manufacturing a vehicle component incorporating lighting effects is provided. The method includes forming a shell for covering a portion of a vehicle, and disposing a lighting material on or within at least a part of the shell, the lighting material for generating light. The method further includes connecting a conductor to the lighting material, the conductor adapted to conduct electrical power to illuminate the lighting material. In some cases, the method can include lining an inside surface of the shell with a layer of protective material.

According to another embodiment, a method of customizing a vehicle using a shell component is provided. The method includes enabling a user to select a vehicle parameter and a vehicle component over which the shell component will be placed when mounted on the vehicle, generating a rendering of the vehicle based on the vehicle parameter and the vehicle component, and transmitting the rendering to be displayed on an interface associated with the user. Further, the method comprises enabling the user to select a customization for the shell component, updating the rendering to depict the shell component with the customization placed over the vehicle component, and transmitting the rendering that was updated to be displayed on the interface. According to this embodiment, the method can further comprise enabling the user to place an order for the shell component according to the rendering that was updated, processing payment information provided by the user to complete the order, and transmitting information associated with the order to a manufacturing entity.

According to another embodiment, a system for customizing a vehicle using a shell component is provided. The system comprises a memory configured to store vehicle parameters and indications of vehicle components corresponding to the vehicle parameters, a communication module for sending and receiving data, and a processor adapted to interface with the memory and the communication module. The processor is configured to enable a user to select at least one of the vehicle parameters and one of the vehicle components over which the shell component will be placed when mounted on the vehicle, generate a rendering of the vehicle based on the selected at least one vehicle parameter and the selected vehicle component, and transmit, via the communication module, the rendering to be displayed on an interface associated with the user. The processor is further configured to enable the user to select a customization for the shell component, update the rendering to depict the shell component with the customization placed over the selected vehicle component, and transmit, via the communication module, the rendering that was updated to be displayed on the interface. In this embodiment, the processor can be further configured to enable the user to place an order for the shell component according to the rendering that was updated, process payment information provided by the user to complete the order, and transmit, via the communication module, information associated with the order to a manufacturing entity.

According to another embodiment, a non-transitory computer-readable storage medium is provided. The non-transitory computer-readable storage medium stores a plurality of instructions which, when executed by a processor, cause the processor to enable a user to select a vehicle parameter and a vehicle component over which a shell component will be placed when mounted on a vehicle, generate a rendering of the vehicle based on the vehicle parameter and the vehicle component, transmit the rendering to be displayed on an interface associated with the user, enable the user to select a customization for the shell component, update the rendering to depict the shell component with the customization placed over the vehicle component, and transmit the rendering that was updated to be displayed on the interface. According to this embodiment, the vehicle parameter is at least one of a vehicle make, a vehicle model, or a vehicle year.

DETAILED DESCRIPTION

Carbon fiber shells with applied visual customizations installed over vehicle components provide significant advantages over modifying the components themselves including allowing otherwise expensive or difficult modifications to be performed on vehicle components at a lower cost while maximizing the use of the vehicle. Visual customizations that can be provided on carbon fiber shells can include custom paint, decals, lighting materials, or custom designs specified by the vehicle owner. By applying the visual customizations to a carbon fiber shell, as opposed to the vehicle itself, the customization can be performed inexpensively and still allow the owner to use the vehicle while the carbon fiber shell is being manufactured customized. Carbon fiber shells can be manufactured in multiple pieces that are installed together to provide the appearance of one continuous surface or that, for example, wrap around external surfaces to provide the look of an entire aftermarket component, such as an aftermarket motorcycle gas tank.

Figure 1:
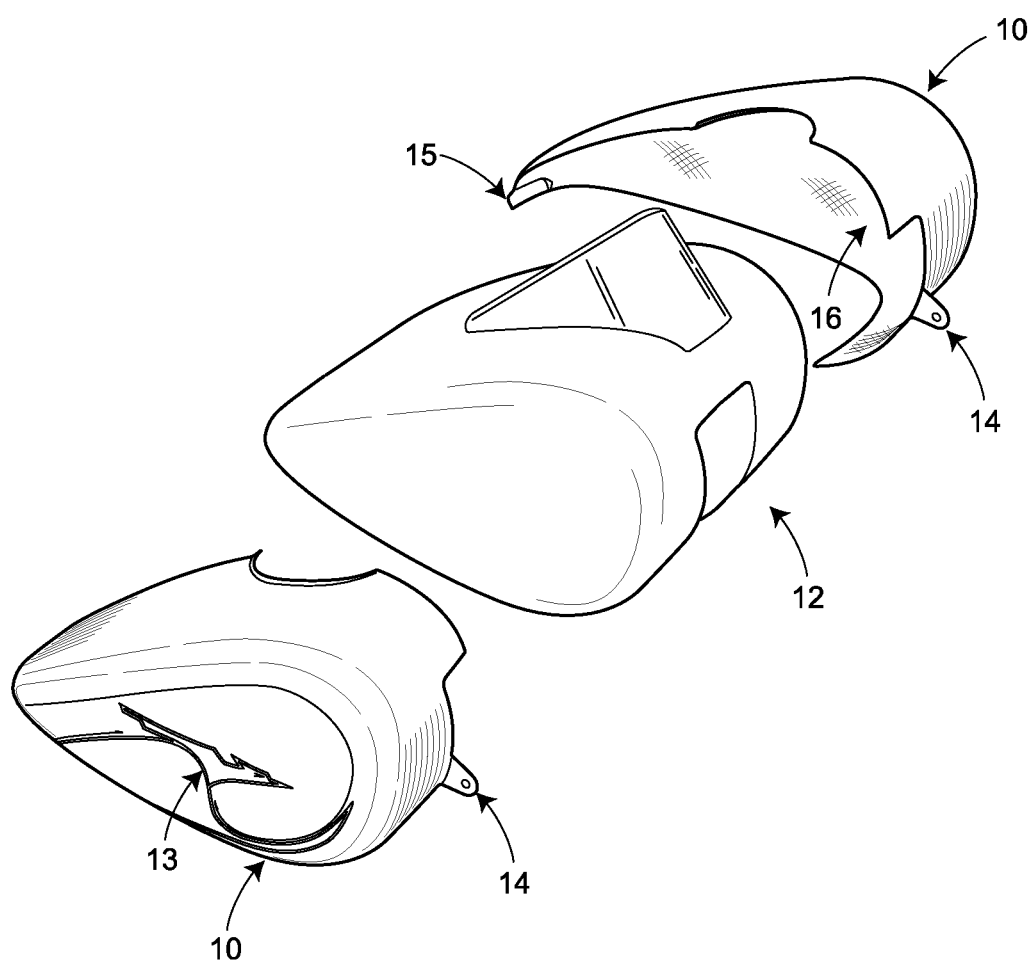
FIG. 1 is an illustration of a set of two halves of a carbon fiber tank shell and corresponding internal protective materials that may be used to customize the appearance of a motorcycle tank.

Turning to a specific example of a carbon fiber shell that may be used to modify the appearance of a vehicle component, FIG. 1 depicts an illustration of a visually customized carbon fiber shell 10 that is placed over and that may be used to customize the appearance of a motorcycle tank 12. The carbon fiber shell 10 of FIG. 1 is illustrated as having a visual or artistic design applied to one or more outside surfaces 13 of the shell 12. The visual or artistic design can be applied, for example, with paint, decals, or wrapping and/or can be applied using lights or electroluminescent materials that can be energized in a manner explained in greater detail below. The visual or artistic design may include a painting scheme, such as a particular paint color or pattern of colors applied to the exterior surfaces of the shell 10, and may also or instead include an artistic rendering of some kind, such as those that include one or more logos, words, signs, symbols, mascots, visual themes, animals, or other artistic renderings.

In the case of FIG. 1, the carbon fiber shell 10 includes two halves, each half including a mounting flange 14 that accepts a bolt, and a ridge fitting 15 that fits over ridges in the surface of the vehicle component, i.e., the motorcycle tank 12, being covered. As will be understood, in this case, the two halves of the tank shell 10 illustrated in FIG. 1 are formed to have interior and exterior surfaces that match or that are formed with the same contours as the outside of the tank 12. The two halves of the tank shell 10 of FIG. 1 can be mounted on the tank 12 from opposite sides of the tank 12 and, when installed on the tank 12, the halves of the tank shell 10 meet in the middle along a longitudinal center line of the tank 12, to thereby cover the tank 12 and give the appearance of one continuous surface. In this case, as better illustrated in FIGS. 2 and 3, a console of the motorcycle may be mounted on top of the tank shell 10 to cover the seam formed between the two halves of the tank shell 10.

Figure 2:
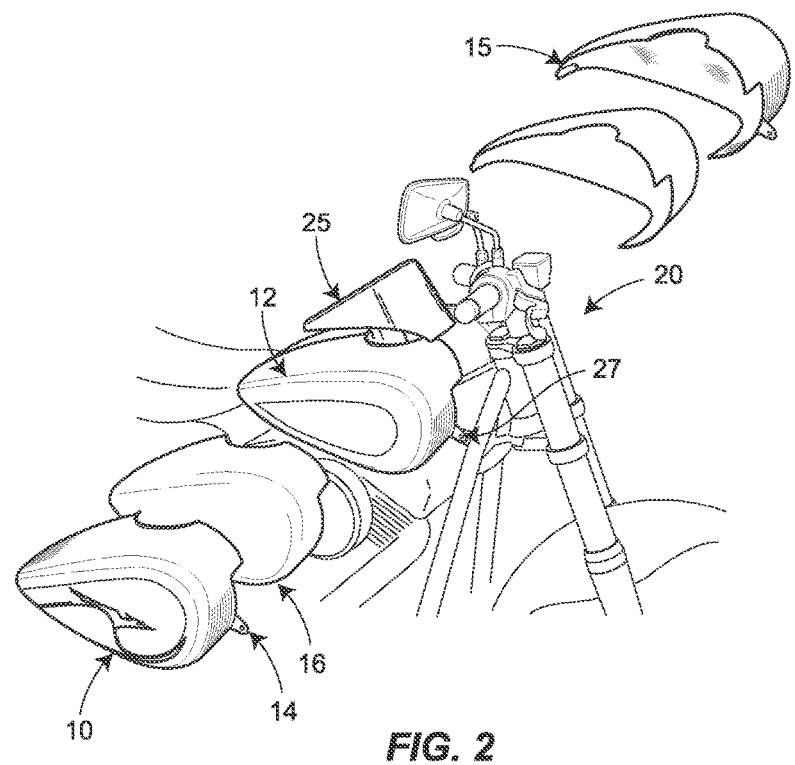
FIG. 2 is an exploded view of the carbon fiber shell of FIG. 1 and a motorcycle tank illustrating the manner in which the carbon fiber shell may be installed over the motorcycle tank.

Referring again to FIG. 1, the carbon fiber shell 10 may, upon being formed, have rough or unsmoothed internal surfaces which, if installed directly over vehicle components such as over the tank 12, may scratch or damage the surface finish on the tank 12. This operation would then damage the original paint or surface treatment of the motorcycle tank 12. To alleviate this problem, a corresponding protective layer of material 16 may be installed on the inside surface of each of the halves of the tank shell 12 to protect the surface finish of the tank 12 when the shell 10 is installed on the tank 12. In particular, the protective layer of material 16 may be formed as a separate component to be of the same shape or contour as the inside of each half of the shell 10, as best illustrated in FIG. 2, and may be mounted to or fixed with adhesive to the inside surface of the tank shell 10. The material 16 may be, for example, a soft or pliant material such as polyester, cotton, etc. and the surface of the material 16 which contacts the tank 12 may be non-adhesive. In one case, the material 16 may be the material sold by the trade name Alcantara® which is a soft and stretchable material. Alternatively, the material 16 may be a foam or other material that can be sprayed onto and cover the inside of the halves of the tank shell 12 without first being formed as a separate sheet of material and which, once sprayed, may dry to form a soft or semi-soft layer of material that is scratch resistant. The protective layer of material 16 protects the vehicle component such as the tank 12 from scratches or damage and also acts to reduce vibration and movement between the carbon fiber shell 10 and the vehicle component, better emulating the actual surface of the underlying vehicle component. The protective layer of material 16 can be constructed of any material that does not permanently adhere to the surface of the vehicle component, while not damaging or otherwise altering the surface of the vehicle component when installed, or removed. The protective layer of material 16 preferably does not extend outside of the carbon fiber shell 10 when installed, and should preferably cover the entire internal surface of the carbon fiber shell 10. Alternatively, instead of using a protective layer of material 16, the internal surface of the tank shell 10 may sanded or machined to be smoothed to eliminate or reduce the ability of the tank shell 10 to scratch the exterior surface of the tank 12 when the tank shell 10 is installed onto the tank 12.

FIG. 2 depicts a close-up view of the motorcycle tank 12 installed on a motorcycle 20, and illustrates a manner in which the carbon fiber shell 10 and protective layer of material 16, once formed, may be installed onto the motorcycle tank 12. A console or an instrument panel 25 of the motorcycle 20 is removed or moved upwards as illustrated in FIG. 2 so that the protective layer of material 16 and carbon fiber shell 10 can be installed underneath the instrument panel 25. The protective layers of material 16 and halves of the carbon fiber shell 10 are mounted on each side of the existing motorcycle gas tank 12 using the existing bolt mounting point or hole 27 on the motorcycle 20 and the ridge fitting 15 on the carbon fiber shell 10. When the halves of the carbon fiber shell 10 are mounted onto the tank 12, the bolt mounting point 27 aligns with and corresponds to the mounting flanges 14 on the shell 10. The ridge fitting 15 fits over a corresponding weld structure on the motorcycle gas tank 12 and may be used to hold the rear end of the tank shell 10 in place with pressure directed to the front of the shell 10. That is, the shell halves 10 may be formed to be tightly fit so that the weld ridge on the tank 12 provides pressure on the ridge fitting of the shell halves 10 holding the rear end of the tank shell 10 in place. The carbon fiber shell 10 fits substantially around the existing motorcycle gas tank 12 in a manner that the existing motorcycle gas tank 12 is no longer visible. In particular, as formed, each of the halves of the tank shell 10 include curves that match the curved sides of the tank 12 on a side, a portion of the top, a portion of the bottom and a portion of the front and rear parts of the tank 12. As such, in this case, the halves of the shell 10 are mounted by sliding these halves from the sides of the tank 12 towards the center of the tank 12 until the inner surface (or the material 16 mounted thereon) of each tank shell half is disposed against the outer side wall of the tank 12, at which point, the ridge fitting 15 will fit over or be over the weld ridge of the tank 12 and the mounting flange 14 will be disposed against or adjacent to the mounting hole 27. In this case, it may be necessary to remove the bolt holding the tank 12 in place from the mounting hole 27 prior to installation of the shell 10.

The protective layer of material 16 is held in place over the motorcycle gas tank 12 by pressure from the overlying carbon fiber shell 10 when installed or may be adhered to the inner surface of the shell 10. When the halves of the carbon fiber shell 10 are installed on both sides of the motorcycle fuel tank 12, and the instrument panel 25 is moved downwards over the halves of the carbon fiber shells 10, the carbon fiber shell 10 gives the appearance of a new surface of the original underlying motorcycle fuel tank 12. Moreover, in this case, the instrument panel 25 covers the seam between the halves of the shell 10 on the top of the tank 12.

Figure 3:
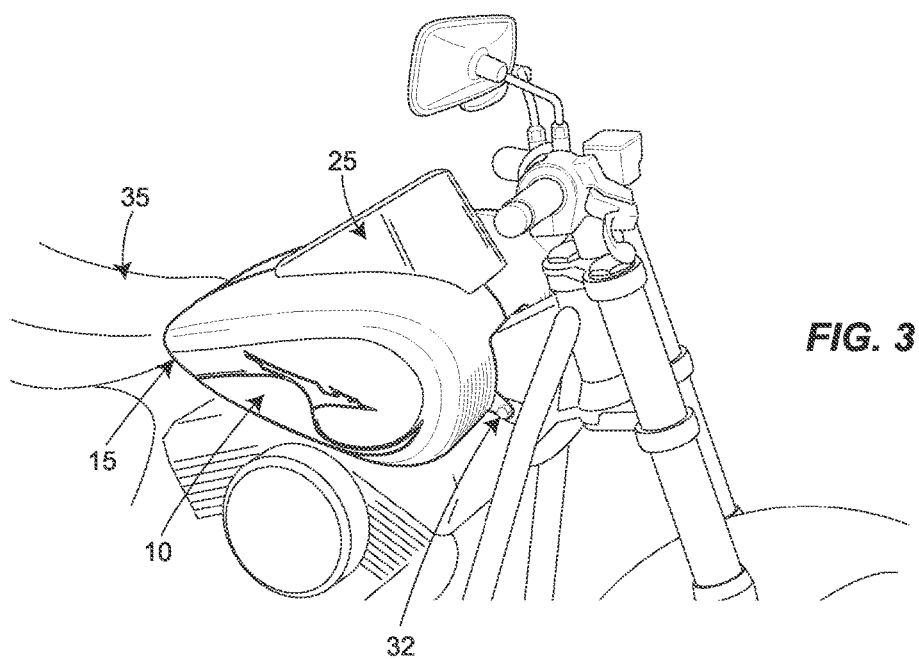
FIG. 3 is a close-up view of a motorcycle tank with a carbon fiber shell installed thereon.

FIG. 3 illustrates the carbon fiber shell 10 installed over a motorcycle fuel tank 12. In this case, a bolt 32 (which may be the original bolt of the motorcycle that holds the tank 12 in place or may be a slightly longer bolt supplied with the tank shell 10) is installed through the mounting flange 14 and into the bolt mounting point 27 of FIG. 2. The instrument panel 25 is now moved downwards onto the carbon fiber shells 10. The ridge fitting 15 is fitted over a corresponding ridge on the motorcycle gas tank directly adjacent to the motorcycle seat 35. The instrument panel 25 that applies friction downward, the bolt 32 installed through the flange 14 and into the bolt mounting point 27, and the ridge fitting 15, all provide mounting mechanisms for holding the halves of the carbon fiber shell 10 in place during operation of the motorcycle 20. Moreover, the various upper and lower curved surfaces of the halves of the tank shell 10 prevent movement of the tank shell 10.

Differing types of visual designs may be placed or painted onto the exterior surface of the carbon fiber shell halves according to the specifications of the user. These visual designs may include painted designs or color schemes, decals, logos, words, signs, symbols, mascots, artistic designs, or any combination thereof. By applying visual designs to the carbon fiber shell, as opposed to the vehicle components themselves, the vehicle itself is not modified. The user may select the design to be painted or applied to the carbon fiber shell from a set of preselected designs or may provide the visual design for instance by electronic means. Alternatively the user may select a wholly designed carbon fiber shell with a visual design thereon, possibly at a lower cost.

Figure 4A:
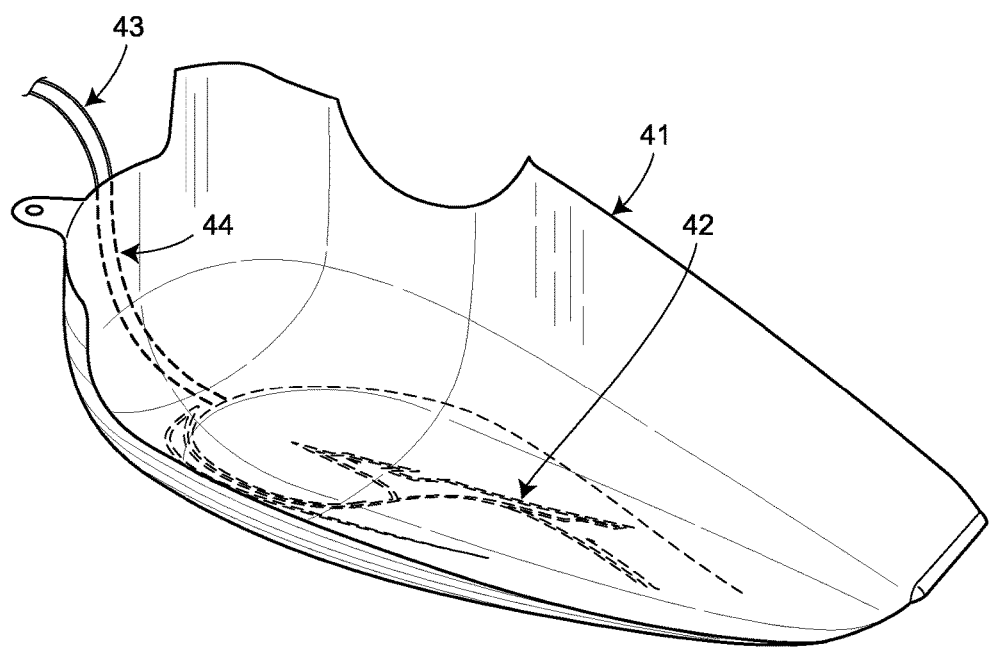
FIG. 4A is an internal view of a carbon fiber shell with electroluminescent material applied to an external surface and illustrating an energization mechanism that energizes the electroluminescent materials.
Figure 4B:
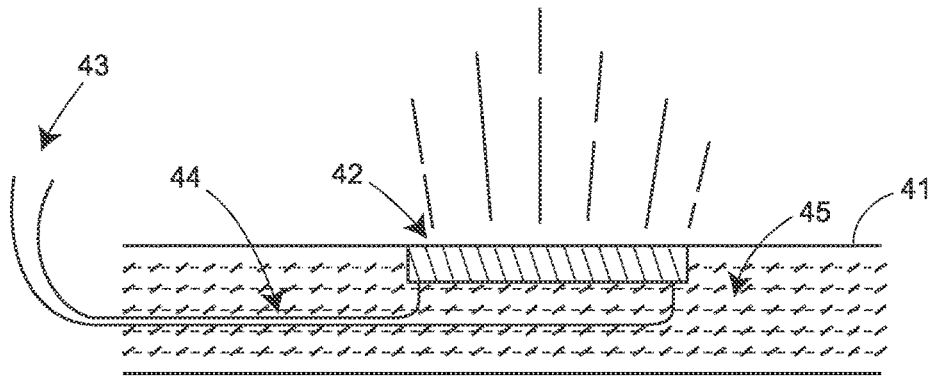
FIG. 4B is a cross sectional view of a portion of the carbon fiber shell of FIG. 4A with embedded electroluminescent materials and embedded wires for energizing the electroluminescent materials.
Figure 4C:
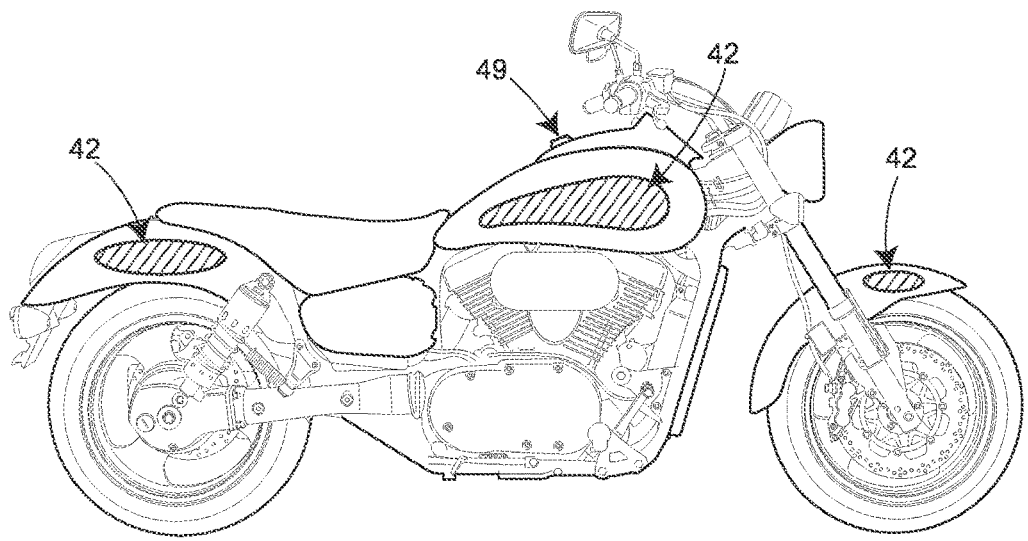
FIG. 4C is an illustration of a motorcycle having a controller for controlling lighting materials on a tank shell and fender shells of the motorcycle.
Figure 4D:
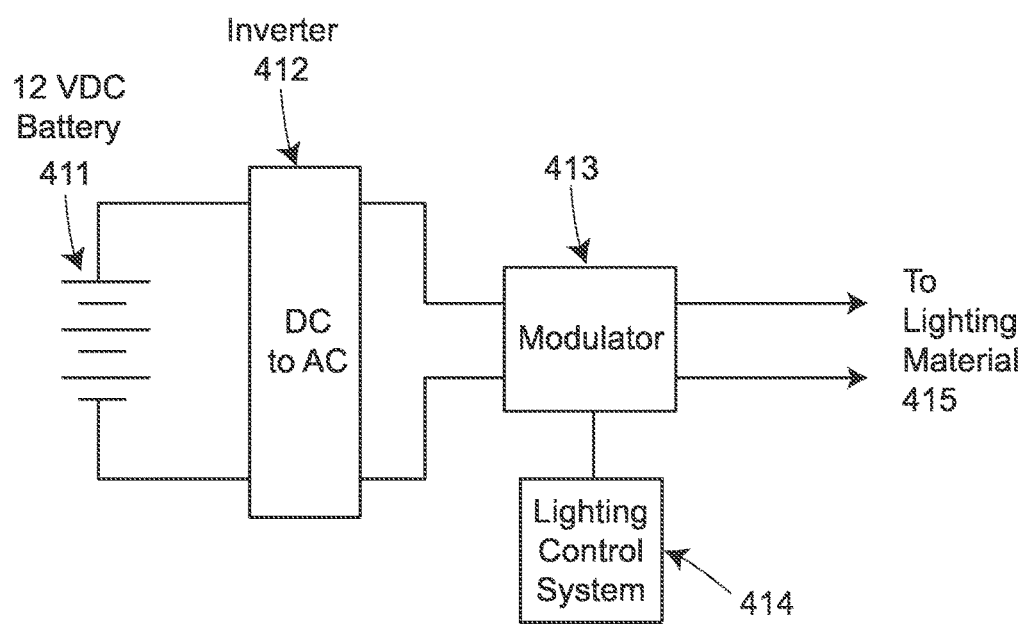
FIG. 4D is a schematic of a control system that may be used to control the energization of lighting materials disposed on or in a shell.

The visual designs may also incorporate lighting effects in the form of electrically energized lighting mechanisms. Lighting effects may be used to form a part of a visual design using, for example, lighting materials applied to one or more external or non-external surfaces of the carbon fiber shell 10 to provide visual customizations. These lighting effects may provide illumination for functional uses (such as turn signaling) or may be provide illumination to produce purely cosmetic effects, or a combination of both. FIG. 4A, illustrates an internal view of a carbon fiber shell 41 with lighting materials 42 (shown in dotted relief) applied in a design on the reverse (external) surface. FIG. 4B illustrates a cross section of the carbon fiber shell 41 of FIG. 4A depicting lighting materials 42 embedded into the layers 45 of carbon fiber material in the shell 41 to provide a smooth external surface and depicts wires 44 embedded within the carbon fiber shell 41 connected to a power source 47 (not shown in FIG. 4B). FIG. 4C illustrates a system where the energization of lighting materials 42 on each of a tank shell and fender shells of a motorcycle are controlled with a controller 49 available to the user. The lighting materials 42 of FIG. 4C may be controlled together or separately as desired. FIG. 4D illustrates a system where lighting materials 415 are controlled or modulated by a vehicle control system 414. In these cases, the lighting materials 42 and 415 may include for instance, electroluminescent tape, light emitting diodes (LEDs), organic light emitting diodes (OLEDs), or active-matrix organic light emitting diodes (AMOLEDs) formed in rows, columns, and/or arrays, incandescent bulbs or strips, neon or other gas filled lights, lit fiberglass tubing, solar panels, photovoltain arrays, or any other type of lighted material that can be installed onto the carbon fiber shells 10 or 41. In some cases, an outside layer such as a transparent layer or other type of protective layer can be disposed on the exterior of the carbon fiber shells 10 or 41 to protect the carbon fiber shells 10 or 41 and cover any visual customizations or lighting effects. The visual customizations or lighting effects can be visible through the outside layer.

As is known, electroluminescent devices such as electroluminescent tapes are actually lamps, as they emit light. However, instead of creating light by heating a filament or by charging a gas field, electroluminescent tape relies on phosphorescent materials which glow when exposed to a small AC electrical current. Electroluminescent tapes generally radiate low heat, require low power and emit a soft light without irritating glare. These tapes are invariably very thin, almost like ribbons or sheets of paper, and they can be produced in a variety of colors. The source of light is a phosphorous mixture which is spread onto a transparent, conductive indium-tin-oxide (ITO) film and then covered with another thin sheet of conductive material. In many electroluminescent tape configurations, electrical power is provided through copper or aluminum foil conductors on either side of the ITO film. However, different conductive materials can be used depending upon design requirements.

Lighting materials generally require an energization mechanism that energizes the materials from an external power source in order to cause the materials to emit light. Dual conductors illustrated in FIGS. 4A and 4B as wires 44 may be disposed within (e.g., between layers of carbon fiber) or in a ridge, depression, or a trough formed within an inner surface of the carbon fiber shell 41 and may operate to provide a supply and return electrical energy (voltage and/or current) for energizing the lights or electroluminescent tape that form the lighting materials 42. The conductors 44 are preferably electrically isolated from the carbon fiber shell 41. A voltage can be applied between or across the dual conductors 44 from the vehicle power system by wires 43 (shown in FIGS. 4A and 4B) to provide a means for energizing the lighting materials 42 applied to or in the surface of the carbon fiber shell 41. When a voltage is applied between the supply and return wires 43, the lighting material 42 emits light. The intensity and color of light emitted by the lighting material 42 can vary based on the method of manufacture of the lighting material 42, the types of lights therein, and the frequency and/or amplitude of an alternating voltage or direct current voltage that may be applied to the wires 43, etc., or any combination thereof.

The lighting material 42 illustrated in FIG. 4A may be embedded within the layers 45 of carbon fiber material to provide a smooth external surface as illustrated in the cross section of FIG. 4B. In the illustrated example, the first two layers 45 of carbon fiber material in FIG. 4B are replaced with the lighting material 42 and are energized with the wires 44 embedded within one or more deeper layers 45 of the carbon fiber shell 41. The wires 44 are connected to a voltage source (which may be the battery or other source connected to the battery of the motorcycle or which may be an externally supplied voltage source) to energize the lighting materials 42. As illustrated in FIG. 4C, the user may have a controller 49 connected to the wires 43 and 44 and to the voltage sources which may be used to turn on or off, or to select particular lighting features or operating modes of the lighting material 42. FIG. 4D illustrates a lighting control system 414 that can modulate an alternating voltage source generated by an inverter 412 based on direct current voltage/current provided from a vehicle battery 411. The lighting control system 414 may be or may receive and operate on, for example, one or more of the engine speed indicator signal, a vehicle speed indicator signal, turn signaling, braking signals, accelerator signals, or may include a strobe signal generator that flashes or ramps-up the brightness of the lighting. The alternating voltage supplied at the output of the modulator 413, which voltage may be modulated by the lighting control system 414, may energize the lighting materials (415 in this case) in accordance with the vehicle control system operating mode selected by the user. For example, the lighting materials 415 may be controlled by the engine speed indicator of the vehicle. In this case, the lighting materials 42 may increase in brightness when the engine speed is high, and decrease in brightness when the engine speed is low, providing a dynamic visual effect. In other cases, the lighting materials 415 may be tied to the operation of the vehicle turn signals, brakes, accelerator, etc. Still further, the vehicle control system 414 may enable the user to select various lighting effects, such as brightness of the lighting effects, a blinking pattern of the lighting effects, timing associated with a periodic operation of the lighting effects, a pattern of operation or energization of the lighting effects, etc.

A vehicle owner or other user may use an electronic ordering system to specify and order customized vehicle components in the form of customized carbon fiber shells, such as those described herein, as part of the process of customizing a vehicle. In particular, a shell manufacturer, a parts supplier, a vehicle manufacturer or customizer or any other third party may provide an electronic ordering system that implements a comprehensive technique to specify, preview, manufacture, and ship customized carbon fiber shells for installation on one or more vehicles. An example of such an electronic ordering system 50 is illustrated in FIG. 5.

Figure 5:
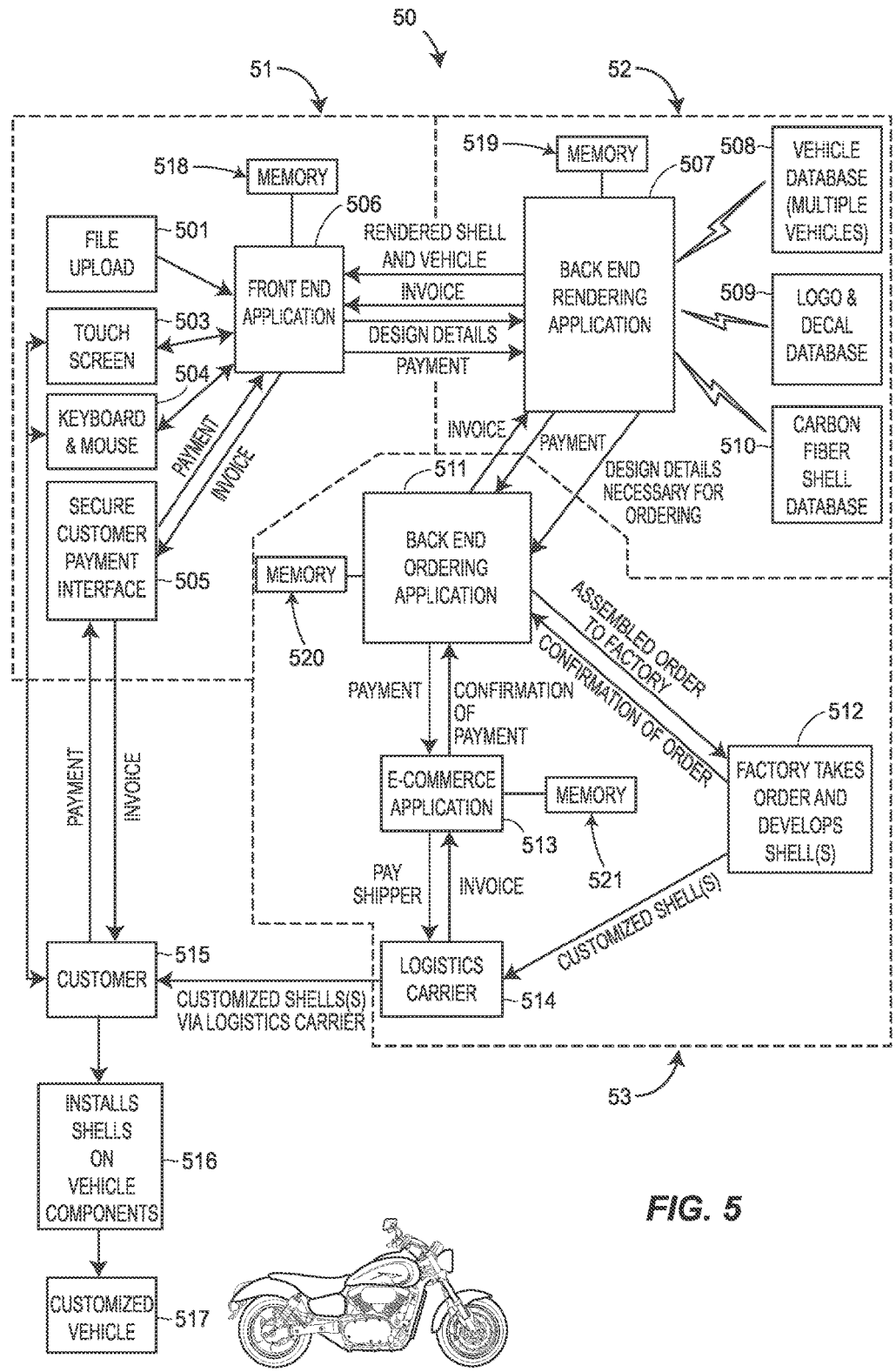
FIG. 5 is a block diagram of an electronic ordering system that may be used to customize the appearance of a vehicle using visually customized carbon fiber shells.

In particular, using the system 50 in FIG. 5, a vehicle owner generally interacts with an electronic portal or computer application to specify the particular vehicle and component to customize and thereby specifies the particular carbon fiber shell to be manufactured or customized, specifies the manner in which selected carbon fiber shell will be customized, previews the customized carbon fiber shell as, for example, installed on a vehicle, and has the ability to order the customized carbon fiber shell. A manufacturer then develops or manufactures the carbon fiber shell to the specifications of the vehicle owner and ships the visually customized carbon fiber shell directly to the owner who may then install the shell on the appropriate vehicle. By utilizing the ordering system 50 of FIG. 5, the owner can continue to use the vehicle while the visually customized carbon fiber shell is being manufactured. The only vehicle down time required is the time needed to install the carbon fiber shell over the vehicle component. If the vehicle owner requires multiple sets of customized carbon fiber shells, they can be ordered at the same time, and the vehicle owner can change the appearance of the vehicle as quickly as the shells can be installed, typically within hours. When the vehicle owner wishes to return the vehicle to "stock" configuration, the carbon fiber shells are simply removed and the vehicle returns to its original, unmodified configuration.

The ordering system 50 illustrated in FIG. 5 generally contains three major components, including a front-end ordering system 51, a back-end rendering component 52 and an ordering component 53. The components 51, 52 and 53 interact with each other to allow a customer to specify, design and order customized shell components. More specifically, a customer generally interacts with the front-end system 51, which takes customer inputs regarding the customized vehicle components to be created, and displays the customized vehicle to the customer for acceptance. In this manner the customer has the ability to see a visual representation of the design or shell either individually on as installed on a vehicle, before deciding whether or not to purchase the carbon fiber shell, or to further modify the design. The back-end rendering component 52 interacts with multiple databases containing available vehicles and vehicle components to both render the customized vehicle for the customer, and when the order is accepted, transmit the necessary details defining the shell component to be manufactured to the back-end ordering component 53. The back-end rendering component 52 is largely transparent to the customer, but has sufficient computing resources, such as is typically provided by a server, to allow the front end component 51 to simply take inputs and display renderings. As such, the front end component 51 may be a web browser, or a thin client application. Once the order is verified and accepted by the customer, the back-end ordering component 53, which is also largely transparent to the customer, sends the completed order to a factory where the shell is manufactured according to the specifications of the user. This factory has the ability to fabricate whole carbon fiber shells and/or to simply render visual designs onto pre-formed carbon fiber shells. The back-end ordering component 53 also accepts customer payments and coordinates the shipment of the order to the home or other delivery location of the customer.

Thus, the components 51, 52 and 53 of the ordering system 50 work together to provide a customer 515 with an end-to-end solution requiring only specification of, payment for, and receipt of the finished product. Turning to the specifics of the three major components of the system 50 of FIG. 5, the front-end component 51 may include a touch screen 503, a keyboard and a mouse 504 and a front-end client graphical application 506 that executes on a processor (not shown) using data stored in a computer-readable memory 518. The application 506 is stored in the memory 518 if desired and executes on the processor to enable a user to specify visual customizations the user wants to see rendered on a specified carbon fiber shell. Optionally, the customer 515 can upload a file 501 containing a custom image they would like to see on a vehicle and store that file in the memory 518. The compiled design details entered by the customer 515 are electronically transmitted from a front end client graphical application 506 to a back-end server rendering application 507 via a communications network (such as the internet) where the design details may be stored in a memory 519.

Figure 6:
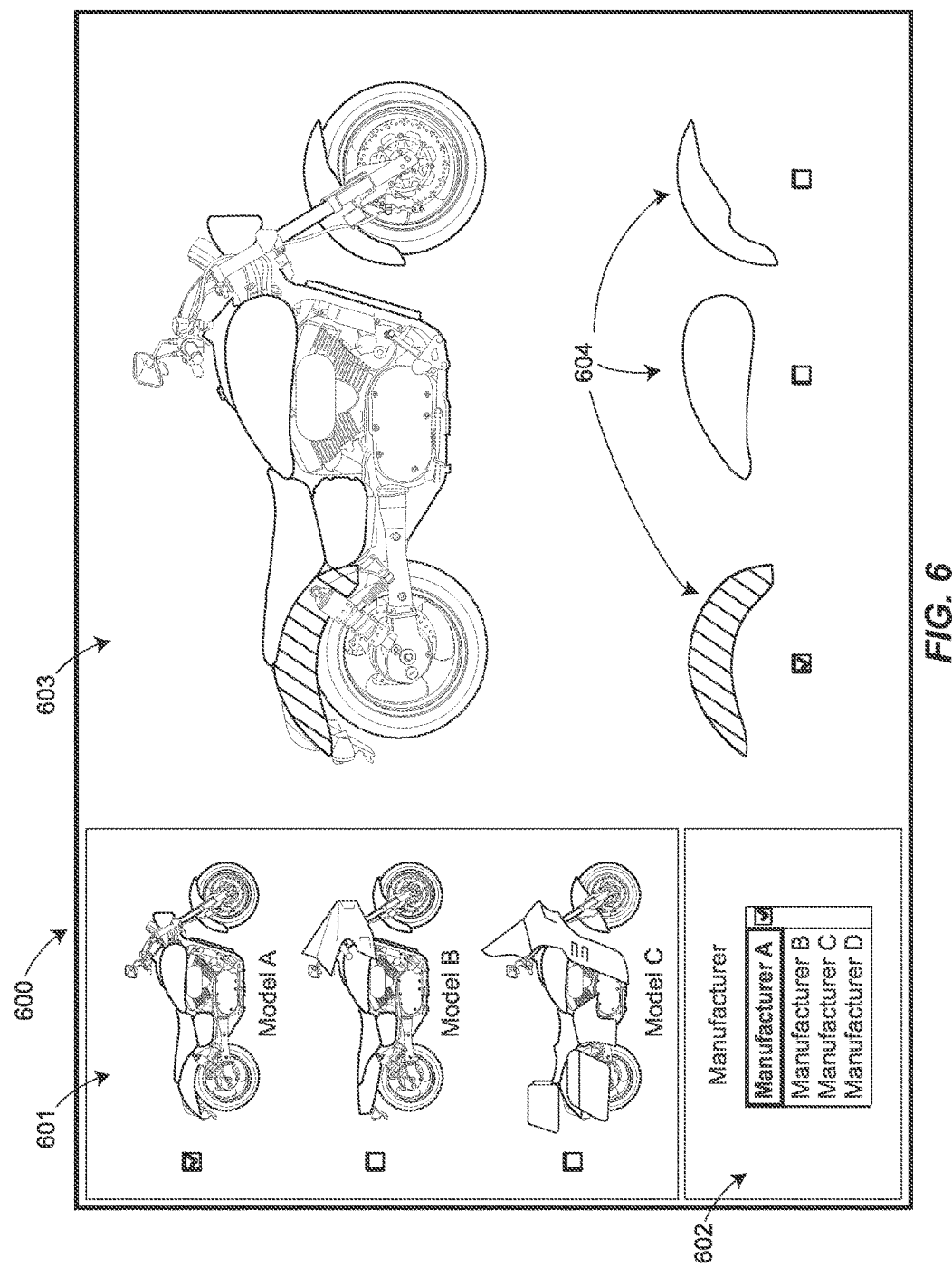
FIG. 6 is an exemplary application window of the ordering system of FIG. 5 that enables a user to select a vehicle manufacturer and model, and to determine vehicle components to be customized.

FIG. 6 is an example application window that may be produced by the application 506 and used to enable a customer to interact with the front-end client graphical application 506 to select parameters that define the carbon fiber shell to be made, such as a vehicle make and model and year, and that enables the customer to specify a particular vehicle component to customize. The customer may select the make or manufacturer of the vehicle with radio buttons 602, and the application 506 may display the available vehicle models 601 along with selectable radio buttons to enable a user to select which vehicle model for which to produce a customized carbon fiber shell. Once the customer selects the make and model and, if needed, year of the vehicle to customize, the application 506 may render a representative vehicle in the window 603 with highlighted vehicle components indicating the particular components of that vehicle for which customized carbon fiber shells can be produced. The application 506 renders corresponding vehicle components and radio buttons 604 on the screen 600 allowing the customer to select one or more of the available components to be customized. Turning back to FIG. 5, the make, model, year, and components of the vehicle selected by the customer in the front-end client application 506 may then be transmitted to the back-end rendering application 507 and may be stored in the memory 519. Of course, the application 506 may interface with the application 507 to obtain the data and screens needed to produce the screen 600 during use by the customer so that all rendering and data manipulation may be performed by the application 507.

The rendering application 507 has access to a vehicle database 508 that contains design and/or configuration data pertaining to a plurality of representative vehicles for which customized carbon fiber shells may be produced. That is, the database 508 may stored rendering data for each of a number of vehicles and rendering and manufacturing data for the carbon fiber shells that can be produced for each of those vehicles. A database 509 may store data defining logos, decals, artistic designs, lighting effects, etc. that can be visually rendered and produced on one or more of the carbon fiber shells and that may be used to define which visual effects to place on a carbon fiber shell to be ordered. Likewise, a database 510 stores available carbon fiber shell shapes 510 upon which visual customizations can be rendered which correspond to components of the representative vehicles in the database 508. The make, model, year and components of the vehicle selected by the user in the front end application 506 determine which vehicle and shells are or can be rendered by the back-end rendering application 507. The rendering application 507 using the specification stored in the memory 519 generates a rendering of the customized carbon fiber shell and reprehensive vehicle and electronically transmits these renderings back to the front-end client graphical application 506 where the renderings are stored in the memory 518 and may be displayed to the user. The front-end client graphical application 506 may use the rendering stored in the memory 518 to display the visually customized carbon fiber shells and the shells as installed on the representative vehicle in three dimensions on the screen 503.

Figure 7:
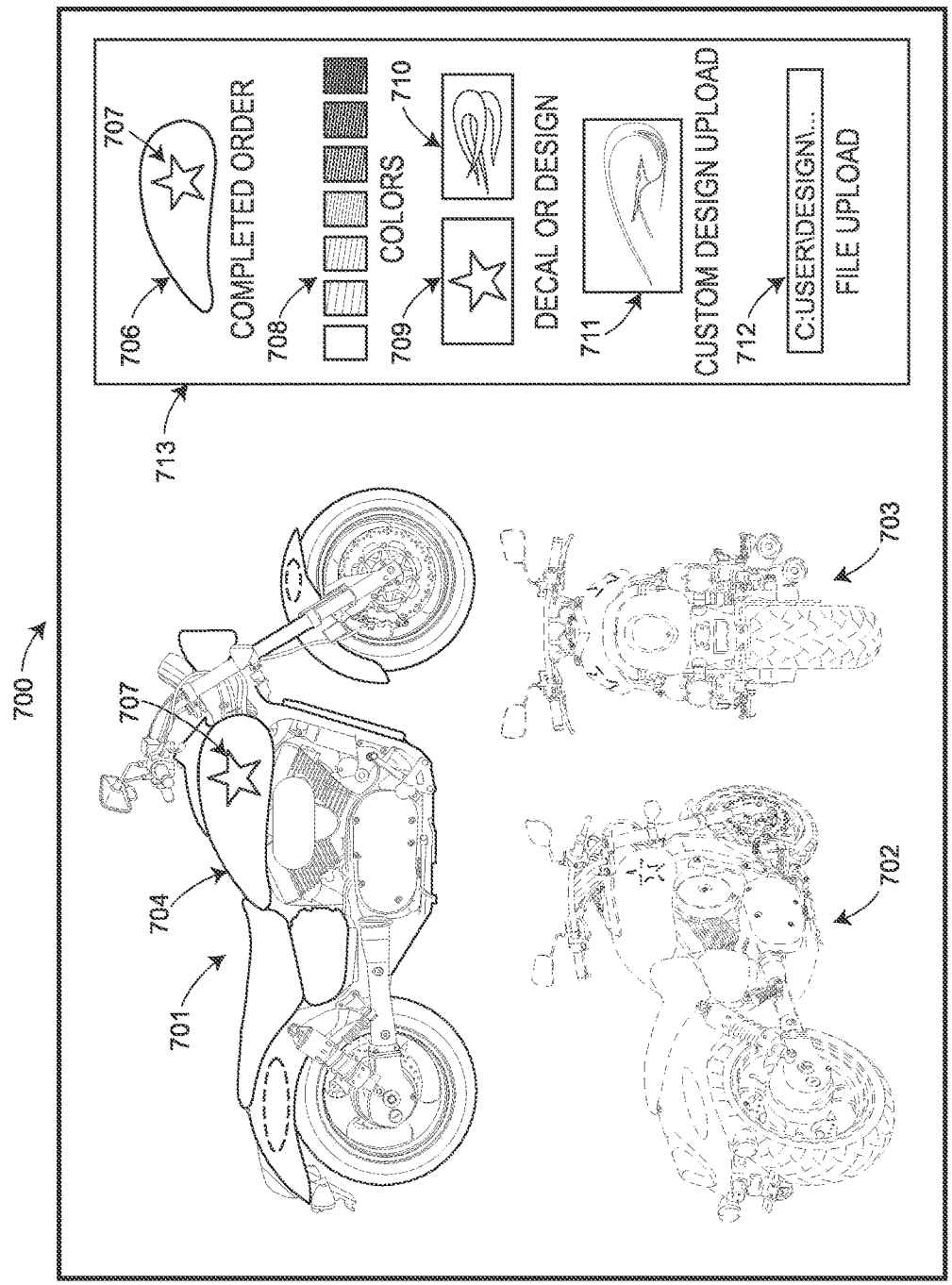
FIG. 7 is an exemplary application window of the ordering system of FIG. 5 that enables a user to customize the appearance of a vehicle, and to preview customizations on a representative vehicle in three dimensions.

As an example, the vehicle and shell renderings created by the back-end rendering application 507 may be displayed to the customer at the front-end application 506 using an example application window 700 illustrated in FIG. 7. The application window 700 displays a representative vehicle 701 with visually customized carbon fiber shells 704 installed over vehicle components, in this case a motorcycle. The vehicle can be rotated in three dimensions to a number of different views including the views illustrated in items 701, 702, and 703 each giving the customer a visual rendering of the vehicle to evaluate the visual customization before purchase. The right hand sidebar 713 provides the user with a mechanism to change the visual customizations rendered on the representative vehicle 701. The customer can further select the vehicle component the customer wishes to visually customize by clicking on that vehicle component and, if a carbon fiber shell is available to customize that vehicle component within the database 510 of FIG. 5, the carbon fiber shell will be rendered in the sidebar 713 as the item 706.

The carbon fiber shell rendering 706 can be visually customized by background color, in the plurality of options illustrated by boxes 708. Further, logos and decals, consistent with or as stored in the database 509 of FIG. 5 may be presented to the customer for addition to the carbon fiber shell rendering 706 as the decal 707 as applied to the shell rendering 706. In the example application window 700 illustrated in FIG. 7, the items 709 and 710 may display pre-stored artistic designs or logos that may be selected and, in this case, the item 709 has been selected by the customer with a mouse click and as such has been rendered both on the carbon fiber shell 706, and on the representative vehicle 704 for evaluation by the customer. Alternatively, the customer may upload an electronic file, in the text box 712, for example a PDF or JPEG file containing a custom image such as that of a club logo or a graphic design to be painted or printed onto the carbon fiber shell as specified by the user. The file to be uploaded may be specified by the customer in a textbox 712, and may be visually rendered for example in a window 711 as an additional image to render onto both the example carbon fiber shell 706 and representative vehicle 701. In this manner, a user or customer may specify customer supplied graphics to be printed or painted onto the carbon fiber shell to be created and may view how these designs look on the actual vehicle via renderings 701, 702 and 703 of the vehicle.

Figure 8:
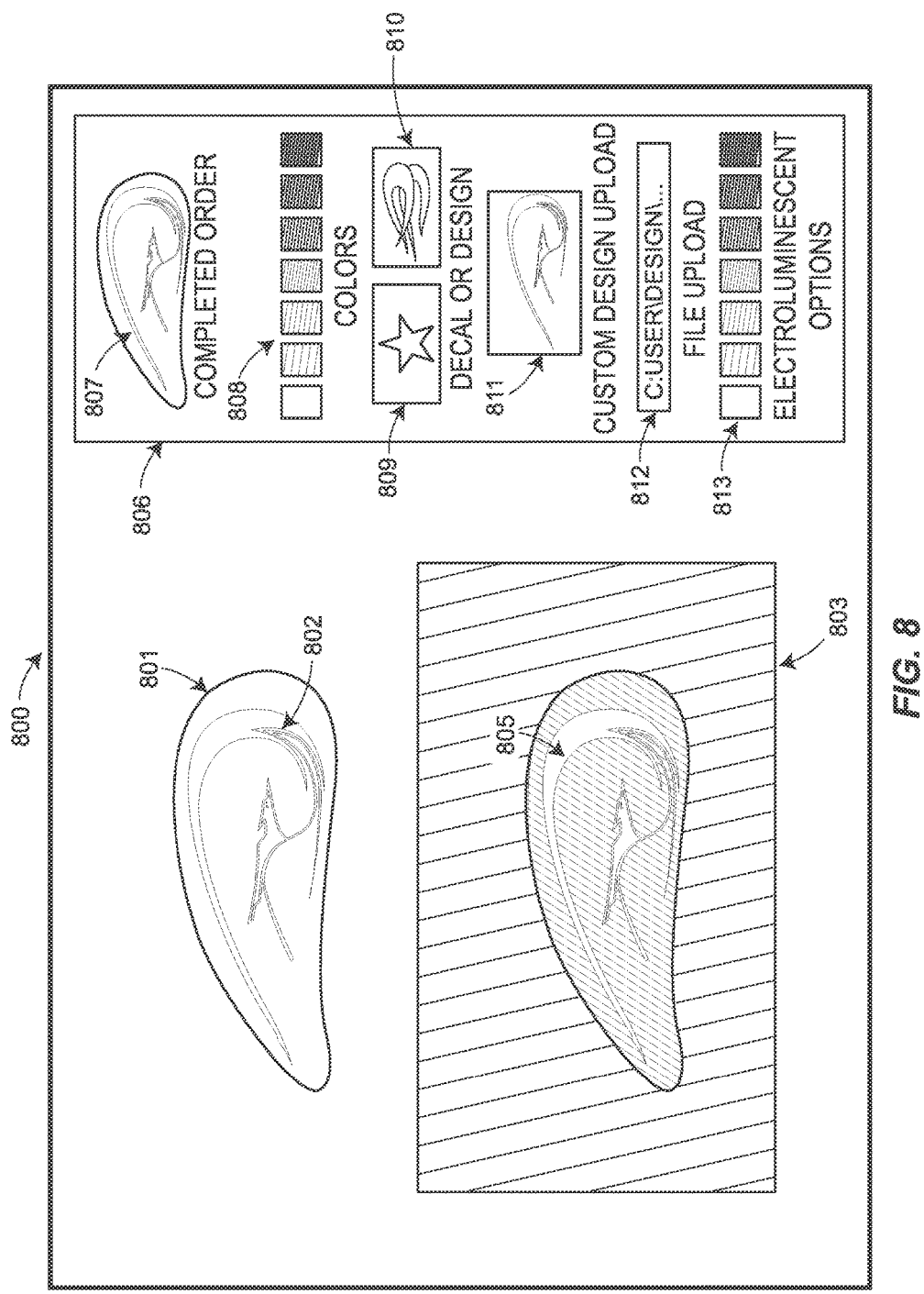
FIG. 8 is an exemplary application window of the ordering system of FIG. 5 that enables a user to specify and preview visual customizations on carbon fiber shells for a vehicle.

Another example application window 800 that may be generated by the front-end client graphical application 506 in FIG. 5 is illustrated in FIG. 8. Here, the application window 800 includes a sidebar 806 that provides a close-up view of a visually customized carbon fiber shell 807 having lighting effects thereon that may be specified by the user. In this example, lighting effects may be obtained using a electroluminescent tape or other material and the design of these materials may be provided by or uploaded via textbox 812 (as a PDF or JPEG file for example) and displayed generally in the view window 811. The visually customized carbon fiber shell 807, containing the visual design uploaded in textbox 812 and rendered in the window 811 is shown in both a day view 801 and a night view 803 in the screen 800 to better illustrate the manner in which the specified lighting effects will look in the daylight and at night. In this case, the electroluminescent portions 802 and 805 of the design appear in the day view 801 and the night view 803 and are lit or illuminated to indicate how these lighting effects will appear on the vehicle when energized. A plurality of different color electroluminescent lighting options may be provided to the customer in the sidebar 806 using the checkboxes 813 and these different colors of lighting effects may be reflected in the views shown in the window 811 and the day and night views 801 and 803, respectively, when selected by a user. Here the customer can select and see how the lighting options will appear in the day view 801 and the night view 803 so as to better enable the customer to visual the look of the carbon fiber shell being created with the lighting effects. Likewise, the customer may select color patterns for the shell via the boxes 808 and may select one or more predefined or pre-stored lighted designs via the boxes 809 and 810. The user may be able to scroll through these boxes to illustrate other possible pre-stored visual designs with or without lighting effects. Of course, the view window 811 may show the currently selected design in more detail and the design in the view window 811 may change when the user selects a different design, either via the boxes 809 and 810 or the text box 812.

Figure 9:
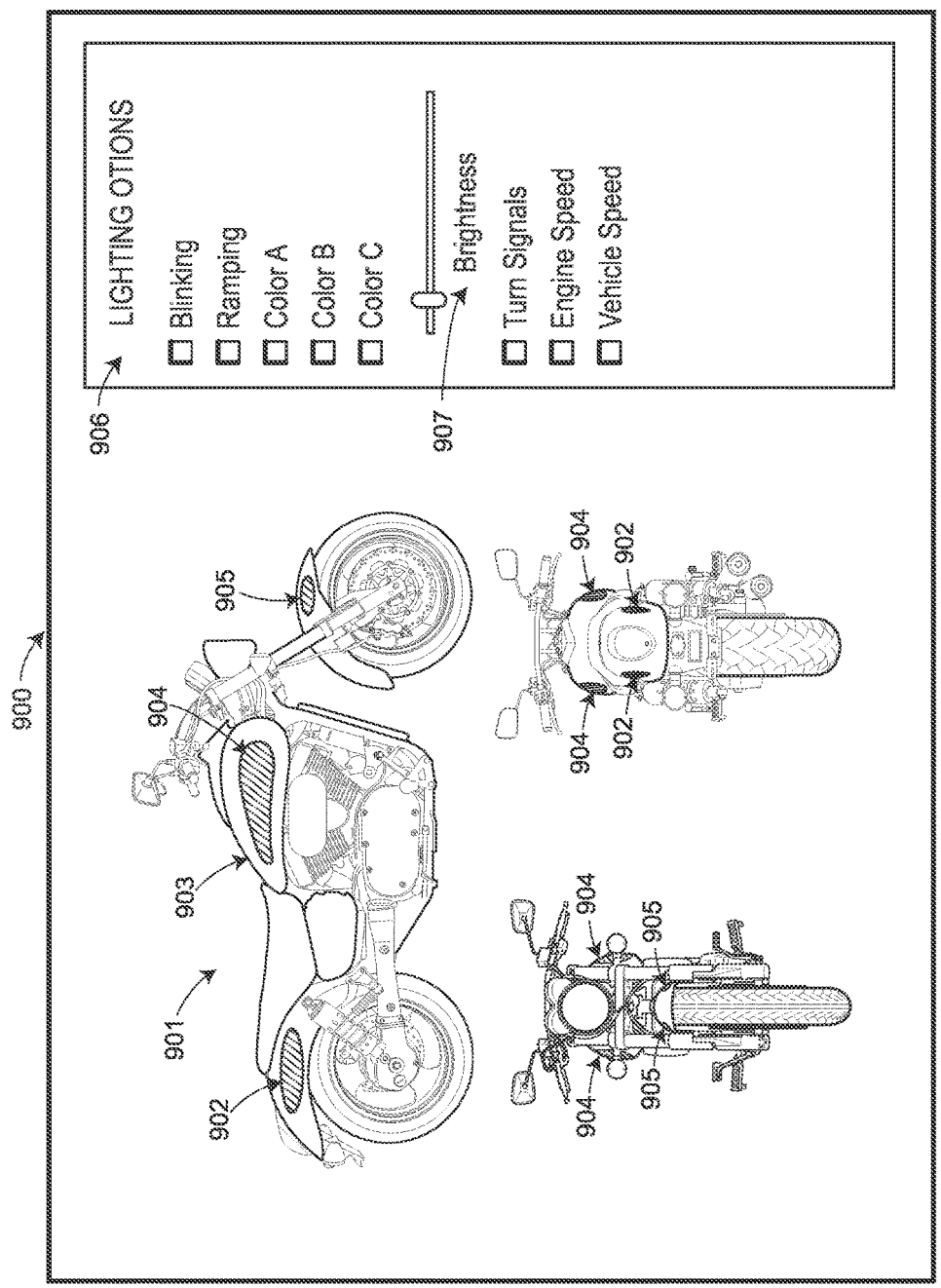
FIG. 9 is an exemplary application window of the ordering system of FIG. 5 that enables a user to preview customized carbon fiber shells installed onto vehicle components with electroluminescent materials on the surface of the carbon fiber shells that change for turn signaling, vehicle speed, or engine speed.

FIG. 9 is an example of an application window 900 providing additional lighting options that may be generated by the front-end client graphical application 506 in FIG. 5 to allow a user to specify and preview the shell design being created. Lighting options can be selected in a right hand sidebar 906, to include blinking, ramping, and different colors for example. A right hand sidebar 907 provides options to connect the lighting materials to turn signaling and engine and vehicle speed indicators although other manners of driving or modulating the lighting features could be specified. In the view 901, lighting materials are applied to carbon fiber shells that are installed over an existing motorcycle gas tank 904, the front wheel well 905, and the rear fender 902. These lighting materials are visible in the front and rear view as well as would be required for example a turn signaling application. The customer 515 reviews the rendered visual customization on carbon fiber shells and installed onto a representative vehicle in three dimensions by interacting with the screen 503 and the keyboard and mouse 504 (of FIG. 5) using the front end client graphical application 506 and the example application windows 600, 700, 800 and 900 of FIGS. 6-9. The customer 515 can then further specify visual customizations based on the visual rendering in the graphical application 506, or decide to purchase one or more of the carbon fiber shells. The back-end server rendering application 507 also generates an invoice that details the costs associated with developing and shipping the visually customized carbon fiber shells to the customer 515. The invoice is electronically transmitted to the front end graphical application 506. The front end graphical application 506 electronically transmits the invoice to a secure customer payment interface 505 to present the payment and ordering details to the customer 515 for review in a secure customer payment interface 505. If the customer decides to purchase the carbon fiber shells, the customer provides payment through the secure customer payment interface 505 in FIG. 5 corresponding to an invoice presented to the customer for review. Payment is forwarded from the secure customer payment interface to the graphical application 506, and to the back-end server ordering application 511.

Once payment is provided to the back-end ordering application 511, the payment is forwarded to an e-commerce application 513 and stored in the memory 521. The e-commerce application 513 provides confirmation of payment back to the ordering application 511. The back-end ordering application 511 then sends the assembled specified order to the factory 512 for development.

The factory 512 may manufacture the visually customized carbon fiber shell using the specifications electronically transmitted from the ordering application 511 which may include data pertaining to the type or shape and size of the carbon fiber shell to be manufactured, the thickness of the carbon fiber shell, the design and lighting effects to be put on the carbon fiber shell and any associated control circuitry need to drive or energize the lighting effects on the carbon fiber shell. Of course, the factory or manufacturer may create the customized carbon fiber shells using standard carbon fiber manufacturing techniques. In one case, the factory may pre-create molds for each of the possible shells to be created or ordered, and may use these molds to create base carbon fiber shells, and may then paint or apply the specified graphics to the carbon fiber shell, as specified by the user. In one case, molds may be created by placing epoxy or other molding material around an actual vehicle component (such as a motorcycle tank or fender), allowing the epoxy to dry and then removing the vehicle component to create a negative mold. Thereafter, to form a carbon fiber shell, a shellac or other clear coat material that forms a smooth surface may be placed onto the inner surface of the mold which, when dried, will enable the mold to create a carbon fiber shell with a smooth outer surface. Thereafter, layers of carbon fiber sheets may be placed or laid into the mold, and a pre-pregnation or stiffening material (such as resin) may be placed between the carbon fiber layers (as placed in the mold). The carbon fiber layers as located within the mold are then heated or baked in an oven so that the stiffening material hardens and dries to form a structurally sound carbon fiber shell. Thereafter, the shell is removed from the mold and may be painted in the desired or specified manner, and may have one or more artistic designs or renderings painted, decaled or wrapped thereon, or otherwise applied thereto. In the case of carbon fiber shells having lighting features therein, the lighting material, such as electroluminescent tape, may be placed in the mold next to the clear coat material and carbon fiber layers may be placed around the tape to form the outer layers of the shell. Wires may be attached to the opposite sides of the tape and may be embedded into the layers of the carbon fiber sheets and run to and connected to an attachment mechanism for attaching the wires to a wiring harness or other control mechanism as the layers of carbon fiber are placed into the mold. In this manner, the tape and the wires are integrally formed with the shell during the manufacturing process. On the other hand, the molds may be formed to include impressions in the outer layers of the shell being created in which electroluminescent tape or other lights may be placed when the shell has been formed. In this case, wiring troughs may be formed or cut into the inner portion of the shell. After the shell is formed and removed from the mold, the tape or other lighting mechanisms are placed into the indentations on the shell and the wires may be connected to the lighting material through the shell and may be run inside the troughs to a wiring harness. Of course, other manners of creating the carbon fiber shells could be used instead. Still further, if desired, painting, decals or other graphic designs may be placed over the lighting materials (i.e., may be put on the outside of the shell over or on top of the lighting materials) so that the light emitted by the lighting materials emits through the various layers, colors or parts of the graphic design differently to create a pleasing visual effect.

Once the visually customized carbon fiber shells and associated wiring and energization components are complete, they are provided to a logistics carrier 514 for shipment. If desired, installation instructions may be provided based on the specific vehicle, mounting and control structure specified. The logistics carrier 514 provides a shipping invoice to the e-commerce application 513 and the e-commerce application 513 provides payment to the logistics carrier 514 associated with that invoice. The logistics carrier 514 delivers the visually customized carbon fiber shells to the customer 515.

When the customer 515 receives the visually customized carbon fiber shells from the logistics carrier 514 the customer 515 installs the visually customized carbon fiber shells onto the vehicle components in a manner consistent with FIGS. 1-3, for example. The customer 515 is able to install the visually customized carbon fiber shells with a basic tool set such as simple wrenches and screw drivers to install bolt through mounting flanges 14 of FIG. 2 into bolt mounting points 27 on the vehicle to install the carbon fiber shells over the corresponding vehicle components, including the underlying non-adhesive protective layer of material 16 in FIG. 2. Mounting ridges 15 illustrated in FIG. 2 can simply be fit over the corresponding ridges on the vehicle component. If the visually customized carbon fiber shell requires installation beneath an existing vehicle component, such as the instrument display 25 of FIG. 2, the vehicle component is lifted over the carbon fiber shell and then installed back on top of the carbon fiber shell.

If the visually customized carbon fiber shells contain lighting materials, for example electroluminescent materials, the corresponding wires in FIG. 4A-D would be installed into or connected into the electrical system of the vehicle. In the example of FIG. 4C, the wires are connected to a controller 49 to allow the user to turn on or off or to select particular control systems, such as turn signaling or engine or vehicle speed, to be used to modulate the energization of the electroluminescent materials. If, for example, electroluminescent materials are installed on the carbon fiber shell, alternating electrical current would be generated from the direct electrical current of the battery of the vehicle 411 through an inverter 412 (FIG. 4D). The wires from the inverter 412 can be connected, for example as depicted in FIG. 4D, to control circuitry 414, through a modulator 413 on the vehicle. By modulating the alternating electrical current with the vehicle control system 414, the energization, and level of illumination of the electroluminescent materials 415 would change based on the vehicle control system, for example turn signaling or vehicle or engine speed indicators. Other examples of lighting materials such as LEDs would not require alternating electrical current for energization and could for example be energized directly from the vehicle direct current battery. The end result is a visually customized vehicle shown in FIG. 5 as item 517 containing visually customized carbon fiber shells.

Moreover, the carbon fiber shells are preferably manufactured using between two and ten layers of carbon fiber and most preferably between three and six layers of carbon fiber to provide a shell of sufficient strength but of minimal thickness. In one preferred case, three or four layers of carbon fiber material are used to produce the carbon fiber shell. However, other numbers of layers could be used as well. In addition, the manufactured carbon fiber shells are preferably between $1/32^{th}$ and $1/8^{th}$ of an inch thick and most preferably the shells, without paint or graphics applied thereto, are approximately $1/16^{th}$ of an inch thick or less. In one embodiment, the shells are preferably manufactured to be between $1/32^{th}$ and $1/16^{th}$ of an inch thick.

Still further, while the vehicle component shells described herein have been described mainly for use with or on motorcycle tanks or fenders, similar shells can be made for other types of vehicles and for other types of components of vehicles, including components for cars, trucks, four wheelers, three wheelers, snow mobiles, jet skis, etc. Thus, the carbon fiber shells described herein and the method for designing and ordering these shells are not limited to shells for motorcycle tanks or even motorcycle parts.

The figures and description provided herein depict and describe preferred embodiments of vehicle component shells and a design and ordering system for such vehicle components shells for purposes of illustration only. One skilled in the art will readily recognize from the foregoing discussion that alternative embodiments of the structures and methods illustrated herein may be employed without departing from the principles described herein. Thus, upon reading this disclosure, those of skill in the art will appreciate still additional alternative structural and functional designs for vehicle component shells and for a system and a process for designing, manufacturing and installing vehicle component shells may be used. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A vehicle body component for a vehicle, the body component comprising:
    a body having an exterior surface, the body including multiple layers of carbon fiber material, the multiple layers of carbon fiber material including at least one inner layer of carbon fiber material;
    a lighting material integrally formed within the body, the lighting material disposed between the at least one inner layer of carbon fiber material and the exterior surface of the body, the lighting material extending through at least one other layer of the multiple layers of carbon fiber material of the body; and
    a conductor connected to the lighting material and adapted to conduct electrical power to illuminate the lighting material.

2. The vehicle body component of claim 1, wherein the exterior surface of the body is smooth.

3. The vehicle body component of claim 1, further comprising a transparent layer disposed at the exterior surface of the body wherein the lighting material is visible through the transparent layer.

4. The vehicle body component of claim 1, wherein the lighting material is disposed in at least one impression formed in the body.

5. The vehicle body component of claim 1, wherein the lighting material is disposed in at least one hole formed in the body.

6. The vehicle body component of claim 1, wherein the conductor is disposed between two of the multiple layers of carbon fiber material of the body.

7. The vehicle body component of claim 1, wherein the conductor traverses the at least one of the multiple layers of carbon fiber material of the body.

8. The vehicle body component of claim 1, wherein the conductor is disposed within a depression formed on an interior surface of the body.

9. The vehicle body component of claim 1, wherein the lighting material comprises a light emitting diode (LED).

10. The vehicle body component of claim 1, wherein the lighting material comprises an electroluminescent tape.

11. The vehicle body component of claim 1, wherein the lighting material comprises one of a gas-filled light and lighted fiberglass tubing.

12. The vehicle body component of claim 1, wherein the body has a thickness in a range of $1/32$ to $1/8$ inches.

13. The vehicle body component of claim 1, further comprising a controller attached to the conductor and a power source, wherein the controller energizes the lighting material by at least one of a direct electrical current and an alternating electrical current.

14. A vehicle shell, comprising:
    a body having an exterior side, the body including multiple layers of carbon fiber material;
    a lighting material integrally formed within the body, the lighting material disposed between one layer of the multiple layers of carbon fiber material of the body and the exterior side of the body, wherein the lighting material extends through at least one other layer of the multiple layers of carbon fiber material; and
    a conductor connected to the lighting material and adapted to conduct electrical power to illuminate the lighting material.

15. The vehicle shell of claim 14, wherein the lighting material is disposed within at least one impression formed in the body.

16. The vehicle shell of claim 14, wherein the lighting material is disposed between the exterior side and an interior side of the body.

17. The vehicle shell of claim 14, wherein the conductor is at least partially disposed between the exterior side and an interior side of the body.

18. The vehicle shell of claim 14, wherein the lighting material comprises a light emitting diode (LED).

19. The vehicle shell of claim 14, wherein the lighting material comprises a phosphorous mixture spread onto a conductive indium-tin-oxide (ITO) film.

20. The vehicle shell of claim 14, wherein the body comprises a contoured shape that matches a similarly contoured shape of an outer surface of a vehicle component of a vehicle.

21. A vehicle body component of a vehicle, the body component comprising:
   a body having an exterior surface, the body including multiple layers of carbon fiber material;
   a lighting material integrated within the body, the lighting material disposed between at least one layer of the multiple layers of carbon fiber material and the exterior surface of the body; and
   a conductor connected to the lighting material and adapted to conduct electrical power to illuminate the lighting material, wherein the conductor extends away from the lighting material and through the at least one layer of the multiple layers of carbon fiber material of the body.

22. The vehicle body component of claim 21, wherein the lighting material comprises a phosphorous mixture spread onto a conductive indium-tin-oxide (ITO) film.

23. The vehicle body component of claim 21, wherein the lighting material comprises an organic light emitting diode (OLED).

24. The vehicle body component of claim 21, wherein the lighting material comprises an active-matrix organic light emitting diode (AMOLED).

25. The vehicle body component of claim 21, wherein the exterior surface is smooth.

26. The vehicle body component of claim 21, further comprising a transparent layer disposed at the exterior surface of the body wherein the lighting material is visible through the transparent layer.

27. A vehicle component for a vehicle, the vehicle component comprising:
   a body having an exterior surface, the body including multiple layers of carbon fiber material;
   a lighting material integrally formed within the body at a first area, the lighting material disposed between a layer of the multiple layers of carbon fiber material and the exterior surface of the body; and
   a conductor connected to the lighting material and adapted to conduct electrical power to illuminate the lighting material, wherein the conductor is at least partially disposed within the body, the conductor extending through the layer of the multiple layers of carbon fiber material of the body at a location spaced from the first area.

28. The vehicle component of claim 27, wherein the conductor is disposed between the exterior surface and an interior surface of the body.

29. The vehicle component of claim 27, wherein the conductor traverses the at least one of the multiple layers of carbon fiber material.

30. The vehicle component of claim 27, wherein the conductor is disposed within a depression formed on an interior surface of the body.

31. The vehicle component of claim 27, further comprising a controller attached to the conductor and a power source, wherein the controller energizes the lighting material by at least one of a direct electrical current and an alternating electrical current.

32. The vehicle body component of claim 1, wherein the lighting material is integrally formed within the body by being baked within the body.

33. The vehicle body component of claim 21, wherein the lighting material is baked within the multiple layers of carbon fiber material.

34. The vehicle component of claim 27, wherein the lighting material is baked within the body.

35. The vehicle body component of claim 1, wherein the lighting material is tubing and the conductor conducts light to the tubing to create lighted tubing.

36. The vehicle body component of claim 1, wherein the conductor conducts electrical power in the form of light.

37. The vehicle body component of claim 1, wherein the conductor conducts electrical power in the form of current.

* * * * *